July 25, 1933.  F. SLUSHER  1,919,384
TIRE BUILDING APPARATUS
Filed April 30, 1930   3 Sheets-Sheet 1
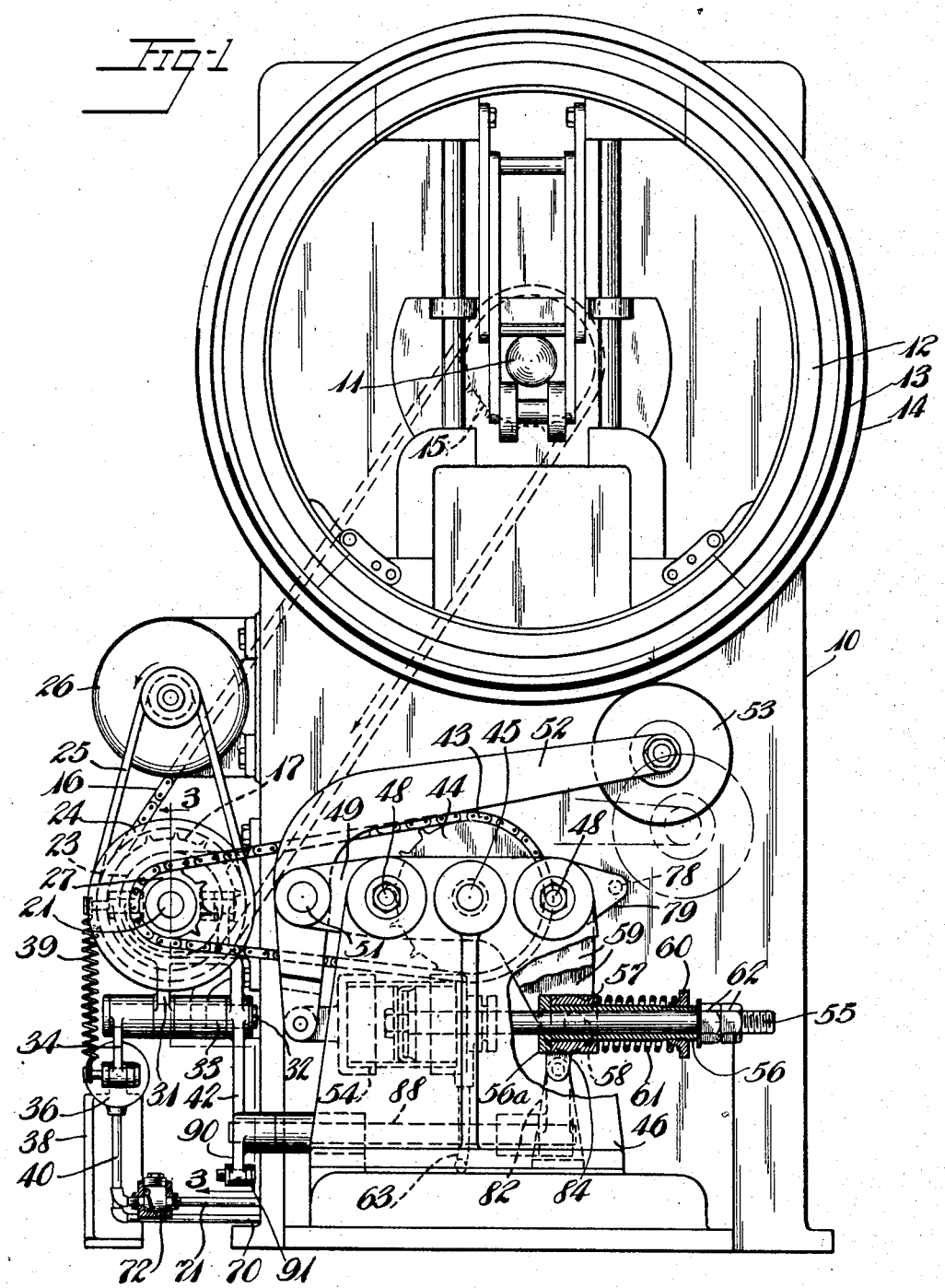
Inventor
Frank Slusher
By Eakin & Avery
Attys.

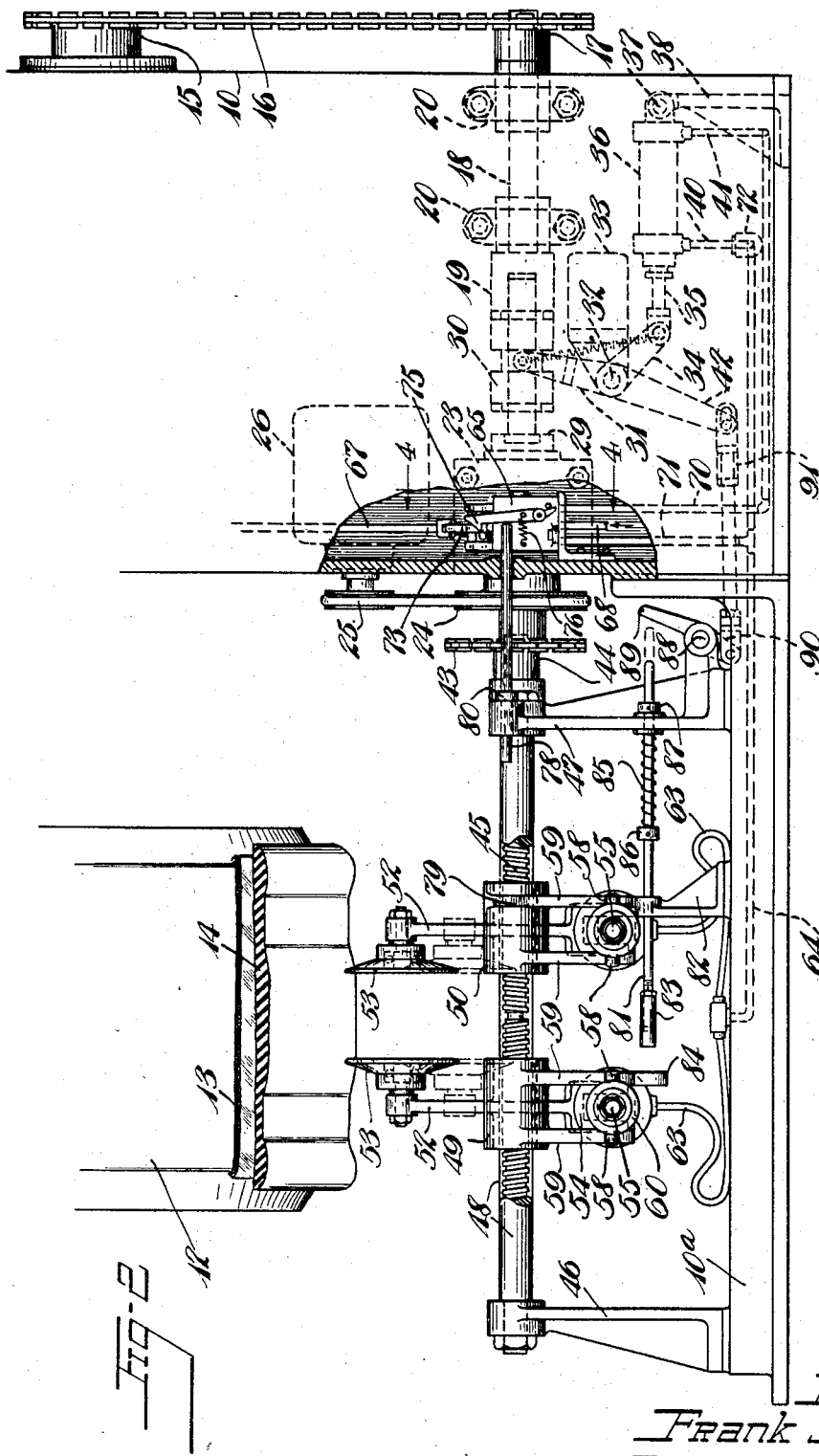

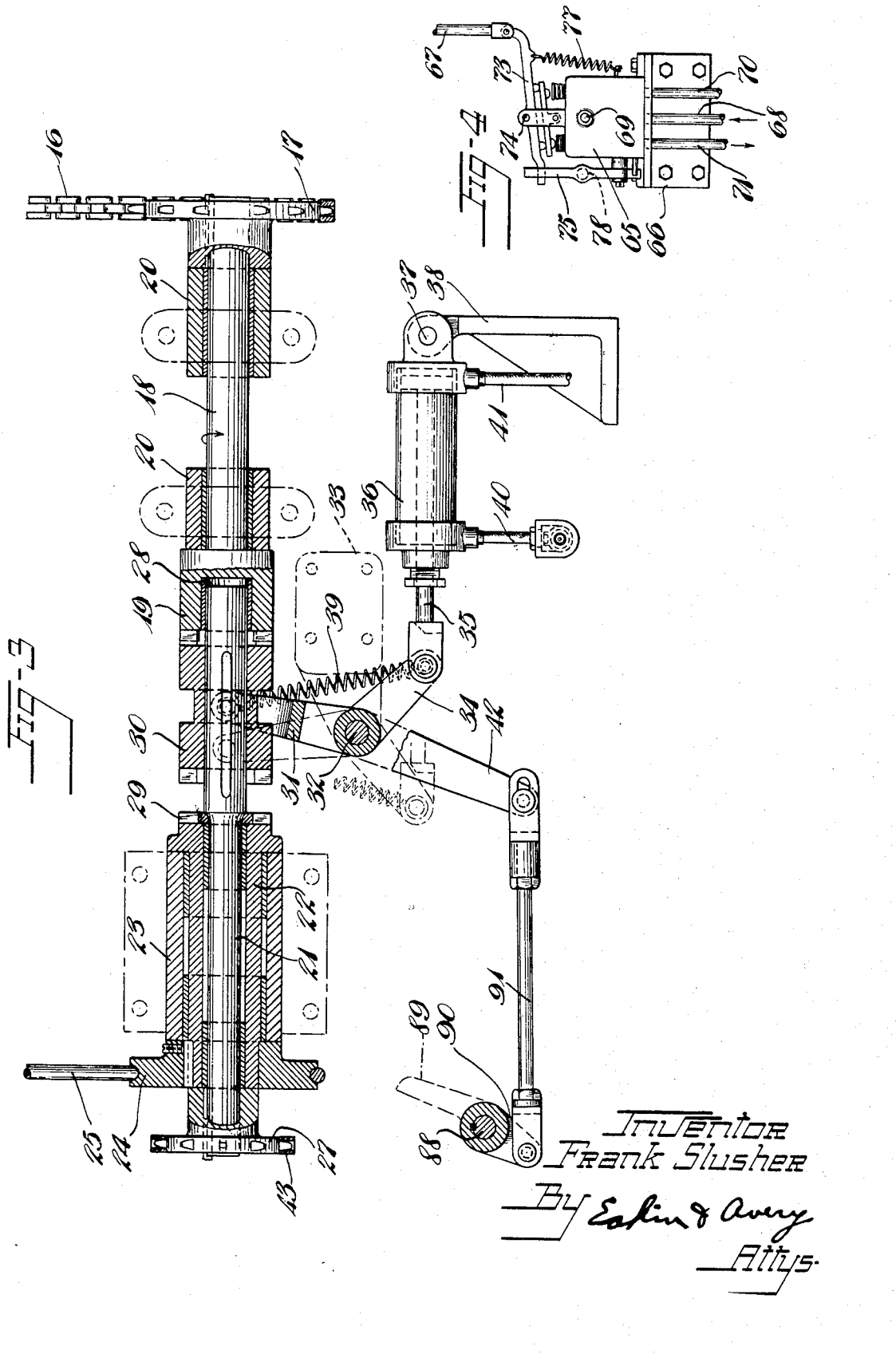

Patented July 25, 1933

1,919,384

UNITED STATES PATENT OFFICE

FRANK SLUSHER, OF AKRON, OHIO, ASSIGNOR TO THE B. F. GOODRICH COMPANY, OF NEW YORK, N. Y., A CORPORATION OF NEW YORK

TIRE-BUILDING APPARATUS

Application filed April 30, 1930. Serial No. 448,548.

This invention relates to tire-building apparatus, and more especially it relates to apparatus for stitching or rolling down the respective fabric plies of a pneumatic tire carcase, and for rolling down the tread portion of a tire upon the underlying carcase thereof.

The chief objects of the invention are to secure improved adhesion of the constituent parts of a pneumatic tire casing; and to effect uniformity of adhesion of the said parts in the manufacture of tires of various sizes. More specifically I aim to provide tire-building apparatus including stitching members in which the latter are independently manipulated in moving them to and from operative position.

Of the accompanying drawings:

Fig. 1 is a front elevation of apparatus embodying my invention in its preferred form, in operative position, and the work therein, parts being broken away and in section.

Fig. 2 is a side elevation of the apparatus shown in Fig. 1, as viewed from the right thereof, parts being broken away and in section.

Fig. 3 is a section on line 3—3 of Fig. 1.

Fig. 4 is a detail elevation of a valve controlling the fluid-pressure operated mechanisms of the apparatus, as viewed from line 4—4 of Fig. 2.

Referring to the drawings, 10 is the housing of a tire-building machine of known design, from the front of which extends a rotatable spindle 11 upon which is mounted a collapsible tire building form or drum 12, a partly built tire comprising a rubberized fabric carcase 13 and rubber tread 14 being shown in the course of construction upon said drum. At the rear of the machine the spindle 11 extends through the housing wall and is provided exteriorly thereof with a sprocket 15 which is connected by a sprocket chain 16 with a sprocket 17 on one end of a counter-shaft 18, the other end of the latter being provided with one member 19 of a jaw clutch. The counter-shaft 18 is journaled in brackets 20, 20 mounted upon a side-wall of the housing 10 near the rear thereof.

Mounted in axial alignment with the counter-shaft 18 is a shaft 21 which is journaled in a quill 22, the latter being journaled in a bracket 23 mounted upon the side wall of the housing 10 adjacent the front thereof. The quill 22 is provided at one end with a pulley 24 having driving connection through a belt 25 with a constantly-driven motor 26 mounted upon the housing 10. The front end of the shaft 21 is provided with a sprocket 27, and the rear end thereof is disposed within a bushed bore 28 in the clutch member 19 of the counter-shaft 18. The opposite end of the quill 22 from the pulley 24 is formed with a jaw clutch member 29. Slidably keyed to the shaft 21, between the clutch members 29 and 19, is a clutch member 30 adapted alternatively to be moved into driving engagement with either clutch member 29 or 19, or to occupy a neutral position between said members, the arrangement being such that the shaft 21 may be driven in one direction by the counter-shaft 18, or in the opposite direction by the motor 26.

For shifting the position of the sliding clutch member 30, a forked shipper lever 31 engaged with said clutch member is pivotally mounted upon a short shaft 32 which is journaled in a journal bracket 33 mounted upon the side wall of the housing 10. Journaled on the shaft 32 is a short link 34 to the free end of which is attached the outer end of the piston rod 35 of a fluid pressure cylinder 36, the link serving to support the front end of the cylinder, and the rear end thereof being swiveled at 37 to a bracket 38 rising from the floor. A tension spring 39 connects the outer end of the piston rod 35 with the shipper lever 31 in such a manner that the spring is over center with relation to the shaft 32 both in the projected and retracted positions of the piston rod, with the result that the clutch member 30 is snapped quickly into engagement with the respective clutch members 19 and 29 solely by the said spring 39. Flexible fluid inlet-and-outlet pipes 40, 41 communicate respectively with the front and rear ends of the cylinder 36. The shipper lever 31 is formed with a downwardly extending arm 42 for a purpose presently to be explained.

The sprocket 27 on the shaft 21 is connected by a sprocket chain 43 with a sprocket 44 mounted upon the end of a threaded shaft or screw 45, the latter being journaled in end-brackets 46, 47 mounted upon a base-plate 10ᵃ at the front of the housing 10. The screw 45 is disposed parallel to the spindle 11 beneath the drum 12, and is formed with right and left-hand threads respectively on opposite sides of the medial plane of the drum. A pair of guide-bars 48, 48 are carried by the brackets 46, 47 at each side of and parallel to the screw 45, and said guide-bars carry a pair of tool-supporting carriages 49 and 50 which are disposed at opposite sides of the medial plane of the drum 12 and are engaged respectively by the right-hand and left-hand threads of the screw 45. The arrangement is such that the carriages 49, 50 are moved toward or away from each other according as the shaft 21 is driven from the counter-shaft 18 or from the motor 26.

Each of the carriages 49, 50 has pivotally mounted thereon at 51 a bell crank 52, one arm of which extends over the screw 45 and has a tire-stitcher disc 53 journaled in its free end. The other arm of the bell crank extends downwardly, and its free end is pivotally connected to one end of a fluid pressure cylinder 54, the piston rod 55 of which extends from its opposite end and is slidably mounted in a sleeve 56. The latter is slidably mounted in a block 57 which is provided with laterally extending trunnions 58, 58 which are swiveled in respective arms 59, 59 formed on the carriage 49 and extending downwardly therefrom, the block 57 being positioned between said arms. The inner end of the sleeve 56 is formed with a flange 56ᵃ which abuts the adjacent face of the block 57, and the outer end of the sleeve is threaded and provided with a nut 60, a compression spring 61 being mounted upon the sleeve between the nut 60 and the outer face of the block 57. Nuts 62, 62 are threaded onto the outer end of the piston rod 55 and bear against the outer end of the sleeve 56.

A flexible fluid pressure inlet-and-outlet pipe 63 communicates with each cylinder 54, and the two pipes 63 connect with a common pressure and exhaust pipe 64. Each pipe 63 communicates with a cylinder 54 between the piston thereof and the end-wall through which the piston rod 55 extends. Thus when the cylinder 54 is charged, it moves axially of its piston rod, to the right as viewed in Fig. 1, and thus raises the long arm of the bell crank 52, and the stitcher disc 53 thereon, from the inoperative, broken line position shown in Fig. 1 to the full line position therein, with the stitcher disc yieldingly urged against the work on the drum 12. The weight of the stitcher disc and the arm on which it is mounted is sufficient to restore the bell crank 52 and the cylinder 54 to inoperative position when the latter is discharged.

The excess of pressure in the cylinder 54, over that required for the proper treatment of the work, is absorbed by the spring 61 as the piston rod 55 is drawn into the cylinder 54 after the movement of the latter is stopped by the engagement of the disc 53 with the work. Thus by adjusting the nut 60 the pressure of the spring 61 may be varied, with the result that it is possible to provide initially for determinate pressure of the disc 53 against the work. Since the spring 61 does not begin to function until the disc 53 engages the work it will be seen that it functions progressively sooner as the diameter of the work increases, whereby the outer plies and tread portion of the work receive greater pressure from the stitcher disc than do the underlying plies of the work. The spring 61 restores the piston rod 55 to inoperative position when the cylinder 54 is discharged.

The fluid pressure cylinder 36 which controls the direction of rotation of the screw 45, and the fluid pressure cylinders 54 which operate the tool-supporting bell cranks 52, are controlled from a single four-way valve 65 which is mounted inside the machine housing 10 upon a supporting bracket 66, and is manually operated by a pull-rod 67 which extends to a point outside the housing conveniently positioned for the operator. The valve 65 comprises a fluid inlet pipe 68, an exhaust port 69, an outlet pipe 70, and an outlet pipe 71. The outlet pipe 70 communicates with the flexible pipe 41 of the cylinder 36. The outlet pipe 71 communicates with the pipe 64 from the cylinders 54, and with the flexible pipe 40 of the cylinder 36, a check valve 72 being mounted at its juncture with the pipe 40, with the result that fluid flows slowly into the cylinder 36 through the pipe 40, but passes quickly through the pipe in the opposite direction. The inlet pipe 68 has connection with a suitable source of pressure fluid (not shown).

The pull rod 67 is connected to one end of an operating arm 73 which is pivoted at its middle, at 74, upon the valve structure 65. A latch 75 is pivotally mounted upon the valve structure 65 and is connected to a tension spring 76 which normally urges it toward latching engagement with the free end of the arm 73. A tension spring 77 is connected to the valve structure 65 and to the arm 73, engaging the latter near the end thereof which is connected to the pull rod 67 and normally urges that end of the arm downwardly. The intermediate portion of the arm 73 is constructed and arranged to operate, in alternation, respective valve mechanisms, the arrangement being such that when the free end of the arm 73 is engaged and held down by the latch 75, as shown in the drawings, pressure fluid from the pipe 68 passes into the pipe 71 and the pipe 70 is vented through the exhaust port 69, and when the arm is in its alternative position with its free end raised the pressure fluid from the pipe 68 passes into the pipe 70 and pressure fluid in the pipe 71 is vented through the exhaust port 69.

When the valve mechanism is in the position shown in Fig. 4, cylinders 54 are charged and hold the stitcher discs 53 against the work, and the screw 45 is driven by the counter-shaft 18 in the direction which feeds the carriages 49, 50 away from each other to carry the discs 53 toward the lateral margins of the work. For automatically reversing the mechanism at the termination of this operation, the bracket 47 is formed with an outstanding ear in which is slidably mounted a push-rod 78 which extends through an apertured boss in the housing 10 and has its inner end abutting the latch 75. The outer end of the push-rod 78 normally is positioned in front of the bracket 47 so as to be engaged by an outstanding ear 79, formed on the carriage 50, when the carriages 49, 50 have moved apart sufficiently for their discs 53 to clear the margins of the work. Inward movement of the push-rod 78 presses the latch 75 out of engagement with the arm 73 and permits the spring 77 to reverse the position of said arm. The spring 76 of the latch 75 moves the push-rod 78 outwardly after the carriage 50 has moved away from the outer end thereof, as the carriages start toward each other, due to the reversing of the apparatus after the arm 73 reverses the valve mechanism. An adjustable collar 80 on the push-rod 78 is adapted to abut the bracket 47 for determining the normal position of the push-rod 78.

In the return of the carriages 49, 50 to starting position, wherein they substantially abut each other, and their discs 53 are substantially together at the medial plane of the work, the movement of the carriages is terminated by stopping the rotation of the screw 45 automatically by disengaging it from its driving means.

For disengaging the screw 45 from its driving means, a push-rod 81 is slidably mounted in the bracket 47 and in a bracket 82 mounted on the base plate 10ª, one end of said push-rod being provided with an adjustable head 83 normally positioned so as to be engaged by an ear 84, formed on one of the arms 59 of the carriage 49, when the latter is substantially at starting position. The movement of the carriage 49 is adapted to move the push-rod 81, to the right as viewed in Fig. 2, against the pressure of a compression spring 85 mounted upon the push-rod between a collar 86 thereon and the bracket 47. A stop-collar 87 is mounted on the push-rod 81 on the opposite side of the bracket 47 from the spring 85 for determining the normal inoperative position of the push-rod.

Journaled in the bracket 47 is a rock-shaft 88 and mounted thereon is a lever-arm 89 which is aligned with the push-rod 81 so as to be engaged by the latter, upon occasion, when the push-rod is moved axially by the carriage 49. Extending downwardly from the rock-shaft 88 is a rocker-arm 90 connected by a lost-motion link 91 with the arm 42 of the shipper lever 31. When the carriages are moving toward each other to starting position, the shipper lever 31 is in the broken-line position shown in Fig. 3, the clutch members 29, 30 are engaged, the arm 42 of the shipper lever is in its alternate position, toward the right as viewed in Figs. 2 and 3, and the lever-arm 89 is inclined to the left as viewed in the same figures so as to be within the operative range of the push-rod 81. When the carriage 49 engages the push-rod 81 and moves it against the lever-arm 89, the lost motion in the link 91 is such that the resulting movement of the arm 42 carries the shipper lever 31 only to intermediate position wherein the clutch member 30 is in neutral position and disengaged from both clutch members 19 and 29, whereby the shaft 21 being without driving means ceases to rotate.

In the operation of the apparatus, the various constituent parts of a tire are assembled upon the rotatable form 12 while the carriages 49, 50 are positioned beside each other in inoperative position, the shipper lever 31 is in its intermediate neutral position, the pull-rod 67 of the valve 65 is drawn downward by the spring 77, and pressure fluid is passing through the pipe 41 to the cylinder 36 so as to hold its piston rod 35 in the projected, broken line position shown in Fig. 3. When it is desired to apply the stitcher discs 53 to the partly built tire upon the rotating form 12 the operator lifts the pull-rod 67, against the spring 77, which depresses the free end of the valve-arm 73 and permits the latch 75 to engage and retain the same, the movement of the arm 73 reversing the valve 65.

The immediate result of the reversing of the valve is to admit pressure fluid, through the pipes 64, 63, to the cylinders 54 of the carriages 49, 50, whereby the bell cranks 52 are manipulated to carry the discs 53 into engagement with the work. The reversing of the valve also vents the cylinder 36 through the pipe 41 and charges it through the pipe 40 to retract the piston rod 35 into the cylinder, the charging being so retarded by the check valve 72 that the form 12 makes one or two complete revolutions before the piston rod 35 is fully retracted. As the outer end of the piston rod 35 moves to the opposite side of the shaft 32, the overcenter spring 39 snaps the shipper lever 31 to the full line position shown in Fig. 3, with the result that the clutch member 30 engages the clutch member 19 to drive the screw 45 through the countershaft 18. The movement of the shipper lever also moves the arm 42 and the lever-arm 89 to the positions shown in the drawings. The rotation of the screw 45 feeds the carriages 49, 50 away from each other and thus causes the discs 53 to move laterally toward the margins of the work as they progressively engage the rotating periphery thereof.

As the discs 53 pass from the marginal portions of the work, the ear 79 of the carriage 50 engages the push-rod 78 and moves it axially, thus moving the latch 75, against the spring 76, and releasing the free end of the valve-arm 73, the spring 77 thereupon moving the latter to its alternative position to reverse the valve 65. This causes the cylinders 54 to discharge through the exhaust port 69 and effects the lowering of the discs 53 to their inoperative position shown in broken lines in Fig. 1. Concurrently the cylinder 36 is discharged through the pipe 40 and charged through the pipe 41, thus projecting the piston rod 35 outwardly to the broken line position shown in Fig. 3. The spring 39 thus being carried over center with relation to the shaft 32, quickly moves the shipper lever 31 to its alternative position and thus moves the clutch member 30 out of engagement with clutch member 19 and into engagement with clutch member 29, with the result that the screw 45 reverses its direction of rotation and starts feeding the carriages 49, 50 toward each other. In the new position of the shipper lever 31 its arm 42 is to the right of the position shown in Fig. 3 and the lever arm 89 is inclined in the opposite direction. As the carriages 49, 50 approach the medial plane of the work, the ear 84 on carriage 49 engages the head 83 of the push-rod 81 and moves the latter axially against the lever arm 89. Thus the lever arm is moved substantially to vertical position, and, by means of the rock-shaft 88, rocker arm 90, and link 91, moves the arm 42 of the shipper lever 31 to an intermediate position, with the result that the clutch member 30 is withdrawn from the clutch member 29 and brought to rest in neutral position. The shaft 21, being disengaged from its driving means, comes to rest, the carriages 49, 50 at this time substantially abutting each other. This completes one cycle of operation of the stitching mechanism, which is repeated as often as the pull-rod 67 is lifted.

The apparatus is entirely automatic in operation, and is easily adapted for operation on work of various sizes. Being independently mounted, the respective stitcher discs 53 follow accurately the contour of the work notwithstanding the unsymmetrical character of the same, with the result that the discs exert equal pressure on the tire at all times.

The invention may be modified within the scope of the appended claims, as I do not limit the claims wholly to the specific construction shown and described.

I claim:

1. In tire-building apparatus, the combination of a rotatable tire-building form, a stitching tool adapted to operate upon a tire on said form, a support for said tool, a rotatable screw permanently engaging said tool support adapted to feed it in the direction parallel to the axis of the form, and means for reversing the rotation of the screw automatically when the tool support reaches a determinate position.

2. In tire-building apparatus, the combination of a rotatable tire-building form, revolvable stitching members, supporting members for said stitching members, a rotatable screw formed with right and left hand threads engaging said supporting members adapted to feed them in opposite directions laterally of the form, means for reversing the rotation of the screw automatically when one of the supporting members reaches a determinate position in its course, and means for stopping the rotation of the screw automatically when one of the tool-supporting members reaches a determinate position in its course.

3. In tire-building apparatus, the combination of a rotatable tire-building form, a pair of revolvable stitching members, respective supporting members for said stitching members, a screw formed with right and left hand threads engaging said supporting members adapted to feed them laterally of the form, and respective power members on the said supporting members for moving the stitching members toward the form, and for moving the stitching members away from the form.

4. In tire-building apparatus, the combination of a rotatable tire-building form, a pair of revolvable stitcher members, respective carriages supporting said stitcher members, a screw formed with right and left hand threads engaging said carriages adapted to feed them laterally of the form, respective power members on said carriages for moving the stitcher members toward and away from the form, means for rotating the screw, and automatic means for delaying the start of rotation of the screw to effect a dwell of the stitching tool in contact with a tire structure on said form.

5. Tire-building apparatus as defined in claim 4 including means for reversing the direction of rotation of the screw and power means for concurrently moving the stitcher members away from the form automatically when a carriage reaches a determinate position.

6. In tire building apparatus, the combination of a rotatable tire-building form, a stitching tool adapted to operate upon a tire on said form, a support for said tool, a screw engaging said tool support adapted to feed it in the direction parallel to the axis of the form, means for automatically rotating the screw in a direction to reverse the travel of said tool support when the latter reaches a determinate position, and means for stopping the rotation of the screw automatically when said tool support reaches a determinate position in its course.

7. In tire building apparatus, the combination of a rotatable tire-building form, a stitching tool adapted to operate upon a tire on said form, a support for said tool, a screw engaging said tool support adapted to feed it laterally of the form, means for effecting movement of the stitching tool toward the form, and means for effecting rotation of said screw, including automatic means for delaying the start of rotation of the screw to effect a well of the stitching tool in contact with a tire structure on said form.

8. Apparatus as defined in claim 7 in which the means for effecting rotation of said screw comprises a fluid pressure control mechanism, and the said means for delaying the start of rotation of the screw comprises means for retarding the flow of the pressure fluid.

9. In tire building apparatus, the combination of a rotatable tire-building form, a stitching tool adapted to operate upon a tire on said form, a support for said tool, a screw engaging said tool support adapted to feed it laterally of the form, power means for moving the stitching tool toward the form, power means for rotating said screw, a common control for said power means, and automatic means associated with said control for delaying the start of rotation of said screw momentarily upon movement of the stitching tool toward the form.

FRANK SLUSHER.